United States Patent
Lim et al.

(10) Patent No.: US 11,659,159 B2
(45) Date of Patent: May 23, 2023

(54) ADAPTIVE IMAGE ENCODING DEVICE AND METHOD

(71) Applicant: Electronics and Telecommunications Research Institute, Daejeon (KP)

(72) Inventors: Sung Chang Lim, Daejeon (KR); Jong Ho Kim, Daejeon (KR); Hae Chul Choi, Daejeon (KR); Hui Yong Kim, Daejeon (KR); Ha Hyun Lee, Daejeon (KR); Jin Ho Lee, Daejeon (KR); Se Yoon Jeong, Daejeon (KR); Suk Hee Cho, Daejeon (KR); Jin Soo Choi, Daejeon (KR); Jin Woo Hong, Daejeon (KR); Jin Woong Kim, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 0 days.

(21) Appl. No.: 16/896,493

(22) Filed: Jun. 9, 2020

(65) Prior Publication Data

US 2020/0304781 A1 Sep. 24, 2020

Related U.S. Application Data

(63) Continuation of application No. 15/954,432, filed on Apr. 16, 2018, now Pat. No. 10,728,541, which is a (Continued)

(30) Foreign Application Priority Data

Dec. 16, 2009 (KR) .................. 10-2009-0125305
May 28, 2010 (KR) .................. 10-2010-0050034
Dec. 14, 2010 (KR) .................. 10-2010-0127500

(51) Int. Cl.
  *H04N 19/105* (2014.01)
  *H04N 19/503* (2014.01)
  (Continued)

(52) U.S. Cl.
  CPC .......... *H04N 19/105* (2014.11); *H04N 19/11* (2014.11); *H04N 19/157* (2014.11);
  (Continued)

(58) Field of Classification Search
  None
  See application file for complete search history.

(56) References Cited

U.S. PATENT DOCUMENTS 7,684,491 B2    3/2010  Wang
9,386,316 B2 *  7/2016  Ye ........................ H04N 19/176
(Continued)

FOREIGN PATENT DOCUMENTS

CN    1596545 A    3/2005
CN    1774934 A    5/2006
(Continued)

OTHER PUBLICATIONS

Han Suh Koo et al., "MVC motion from neighbor 1-15 View," 21. JVT Meeting; 78. MPEG Meeting; Oct. 20, 2006-Oct. 27, 2006; Hangzhou; (Joint Video Team of ISO/IEC JTC1/SC29/WG11 and ITU-T-SG. 16), No. JVY-U091, Oct. 22, 2006 (Oct. 22, 2006) XP030006737, Sections 1-4.
(Continued)

*Primary Examiner* — Chikaodili E Anyikire
(74) *Attorney, Agent, or Firm* — Michael Best & Friedrich LLP

(57) ABSTRACT

Provided are an image encoding method and device. When carrying out image encoding for a block within a slice, at least one block in a restored block of the slice is set as a reference block. When this is done, the encoding parameters of the reference block are distinguished, and the block to be encoded is encoded adaptively based on the encoding parameters.

3 Claims, 13 Drawing Sheets

Related U.S. Application Data continuation of application No. 13/516,863, filed as application No. PCT/KR2010/009026 on Dec. 16, 2010, now Pat. No. 10,419,752.

(51) Int. Cl.
- *H04N 19/176* (2014.01)
- *H04N 19/46* (2014.01)
- *H04N 19/593* (2014.01)
- *H04N 19/11* (2014.01)
- *H04N 19/157* (2014.01)

(52) U.S. Cl.
CPC .......... *H04N 19/176* (2014.11); *H04N 19/46* (2014.11); *H04N 19/503* (2014.11); *H04N 19/593* (2014.11)

(56) References Cited

U.S. PATENT DOCUMENTS

| | | | |
|---|---|---|---|
| 2003/0206594 A1* | 11/2003 | Zhou | H04N 19/105 375/240.16 |
| 2003/0223645 A1* | 12/2003 | Sun | H04N 19/196 382/239 |
| 2005/0013494 A1* | 1/2005 | Srinivasan | H04N 19/86 382/233 |
| 2005/0163216 A1 | 7/2005 | Boom et al. | |
| 2006/0115001 A1 | 6/2006 | Wang et al. | |
| 2006/0133677 A1* | 6/2006 | Park | H04N 19/187 382/236 |
| 2006/0146939 A1 | 7/2006 | Wang | |
| 2006/0269153 A1 | 11/2006 | Shi et al. | |
| 2008/0063072 A1 | 3/2008 | Suzuki | |
| 2008/0107177 A1 | 5/2008 | Han et al. | |
| 2008/0175316 A1 | 7/2008 | Han | |
| 2008/0187044 A1 | 8/2008 | Kim et al. | |
| 2008/0243971 A1 | 10/2008 | Po et al. | |
| 2009/0175334 A1* | 7/2009 | Ye | H04N 19/46 375/240.12 |
| 2009/0232217 A1 | 9/2009 | Lee et al. | |
| 2009/0304084 A1 | 12/2009 | Hallapuro et al. | |
| 2009/0310677 A1 | 12/2009 | Shiodera et al. | |
| 2010/0040153 A1 | 2/2010 | Imanaka et al. | |
| 2010/0061451 A1 | 3/2010 | Fuchigami | |
| 2010/0086051 A1 | 4/2010 | Park et al. | |
| 2010/0098345 A1 | 4/2010 | Andersson et al. | |
| 2010/0260261 A1 | 10/2010 | Kotaka et al. | |
| 2010/0284458 A1 | 11/2010 | Andersson et al. | |
| 2010/0309987 A1 | 12/2010 | Concion et al. | |
| 2011/0206135 A1 | 8/2011 | Drugeon et al. | |
| 2012/0008675 A1 | 1/2012 | Karczewicz et al. | |
| 2012/0177109 A1 | 7/2012 | Ye et al. | |
| 2012/0328004 A1 | 12/2012 | Coban et al. | |
| 2014/0010283 A1 | 1/2014 | Etri | |

FOREIGN PATENT DOCUMENTS

| | | |
|---|---|---|
| CN | 101258755 A | 9/2008 |
| CN | 101379816 A | 3/2009 |
| CN | 101502124 A | 8/2009 |
| CN | 101584218 A | 11/2009 |
| EP | 2271109 B1 | 5/2014 |
| JP | 10004556 A | 1/1998 |
| JP | 2004023458 A | 1/2004 |
| JP | 2004304724 | 10/2004 |
| JP | 2006005438 A | 1/2006 |
| JP | 2006304107 | 11/2006 |
| JP | 2007504760 A | 3/2007 |
| JP | 2009021673 A | 1/2008 |
| JP | 2008118701 A | 5/2008 |
| JP | 2008283490 A | 11/2008 |
| JP | 200955519 A | 3/2009 |
| JP | 2009111733 A | 5/2009 |
| JP | 2009118233 | 5/2009 |
| JP | 5593397 B2 | 8/2014 |
| JP | 2019-17089 A | 1/2019 |
| JP | 2019-17090 A | 1/2019 |
| KR | 1020040054618 A | 6/2004 |
| KR | 1020060065740 A | 6/2006 |
| KR | 1020070027422 A | 3/2007 |
| KR | 1020080035390 A | 4/2008 |
| KR | 1020080088042 A | 10/2008 |
| KR | 1020090048573 A | 5/2009 |
| KR | 1020090058954 A | 6/2009 |
| KR | 1020090065401 A | 6/2009 |
| KR | 1020090099098 A | 9/2009 |
| KR | 1020090099234 A | 9/2009 |
| KR | 1020090099589 A | 9/2009 |
| WO | WO02/054779 A2 | 7/2002 |
| WO | WO2004/008775 A1 | 1/2004 |
| WO | WO2005/027497 A2 | 3/2005 |
| WO | WO2007/029945 A1 | 3/2007 |
| WO | WO2008/126135 A1 | 10/2008 |
| WO | WO2008/127597 A2 | 10/2008 |
| WO | WO2008/157269 A2 | 12/2008 |
| WO | WO2009/049250 A2 | 4/2009 |
| WO | WO2009/115901 A2 | 9/2009 |
| WO | WO2011/061880 A1 | 5/2011 |
| WO | 2008/110999 A2 | 9/2018 |

OTHER PUBLICATIONS

"Anticipatory Joint Model (JM) of Enhanced-Compression Video Coding," 57. MPEG Meeting; Jul. 16, 2007-Jul. 20, 2001; Sydney; (Motion Picture Expert Group or ISO/IEC JTC1/SC29/WG11), No. N4355, Jul. 21, 2001 (Jul. 21, 2001), XP030011969, ISSN: 0000-0369.

"Advanced video coding for genetic audiovisual services," Recommendation ITU-T H.264, Mar. 2009, p. 28.

"Test Model under Consideration," Joint Collaborative Team on Video Coding (JCT-VC) of ITU-T SG16 WP3 and ISO/IEC JTC1/SC29/WG11 2nd Meeting: Geneva, CH, Jul. 21-28, 2010, pp. 1, 16, 86.

Martin Winken et al., "Description of video coding technology proposal by Fraunhofer HHI," Joint Collaborative Team on Video Coding (JCT-VC) of ITU-T SG16 WP3 and ISO/IEC JTC1/SC29/WG11 1st Meeting: Dresden, DE, Apr. 15-23, 2010 pp. 1, 9, 10.

Joel Jung et al., "Competition-Based Scheme for motion vendor selection and coding," Video Coding Experts Group 29th Meeting, Jul. 17-18, 2006, pp. 1-7, VCEG, Klagenfurt, Austria.

Alexis Michael Tourapis et al., "Direct Mode Coding for Bipredictive Slices in the H.264 Standard," IEEE Transactions on Circuits and Systems for Video Technology, Jan. 2005, pp. 119-126, vol. 15, No. 1, IEEE, Piscataway, NJ, USA.

Iain E. Richardson, "H.264 and MPEG-4 Video Compression," Oct. 17, 2003, "Chapter 6: H.264/MPEG4 Part 10," John Wiley & Sons Ltd., West Sussexx, England.

Jung, "Core Experiment 9: Motion Vector Coding," Joint Collaboration Team on Video Coding (JCT-VC) of ITU-T SG16 WP3 and ISO/IEC JTC1/SC29/WG11, 3rd Meeting: Guangzhou, CN, Oct. 7-15, 2010.

\* cited by examiner

ADAPTIVE IMAGE ENCODING DEVICE AND METHOD

This application is a continuation of application Ser. No. 15/954,432, filed on Apr. 16, 2018, which is a continuation of application Ser. No. 13/516,863, filed on Jun. 8, 2012, now U.S. Pat. No. 10,419,752, which is a U.S. national stage application of International Application No. PCT/KR2010/009026, filed on Dec. 16, 2010, which claims the benefit of Korean Patent Application No. 10-2010-0127500, filed Dec. 14, 2010, Korean Patent Application No. 10-2010-0050034, filed May 28, 2010, and Korean Patent Application No. 10-2009-0125305, filed Dec. 16, 2009, in the Korean Intellectual Property Office, the entire disclosures of which are incorporated herein by reference for all purposes.

TECHNICAL FIELD

The present invention relates to a method and apparatus for video coding, and more particularly, to an apparatus and method using an adaptive video coding.

BACKGROUND ART

In a method of coding a video, a motion vector and a reference picture index of a coding target block may be determined using a motion vector and a reference picture index of a neighboring block in conventional P_SKIP and B_SKIP modes.

However, when the motion vector or the reference picture index of the neighboring block does not exist, the P_SKIP or the B_SKIP mode may be performed using a motion vector (0, 0) or a reference picture index of '0'.

Consequently, this scheme does not properly use local characteristics adjacent to the coding target block.

In general, there exists a high correlation between the coding target block and the neighboring block thereof. A context model may be widely reflected in an video coding standard to be used based on an assumption with respect to the correlation.

The video coding standard may support an intra-coding in a inter slice. In a specific environment, there is a case in which an importance of an intra-coded macro block (MB) within the inter slice may be much greater than that of an inter-coded macro block.

DISCLOSURE OF INVENTION

Technical Solutions

According to an aspect of an exemplary embodiment, there is provided a video coding method, including: reconstructing a plurality of blocks within a first slice with respect to the first slice including the plurality of blocks; determining at least one block among the plurality of reconstructed blocks as a referencing block; discriminating a coding parameter of the referencing block; and adaptively coding a coding target block within the first slice based on the coding parameter.

The referencing block may be determined based on similarity in pixel values between the plurality of reconstructed blocks and the coding target block.

The referencing block may be determined based on similarity in coding parameters between blocks, and the coding parameter may include at least one of an example with respect to at least one of an intra-prediction mode, an inter prediction mode, a motion vector, a reference picture index, a coded block pattern, a quantization parameter, a block size, block partition information, and a macro block type, a statistical example, and a combined example.

The similarity in the coding parameters between the blocks may be determined through at least one combination among the coding parameters. The referencing block may be determined in accordance with a relative position with respect to the coding target block.

The referencing block among the plurality of reconstructed blocks may be at least one block most adjacent to the coding target block.

The referencing block may be a reconstructed block in which a block position within a picture corresponds to the coding target block within the previously reconstructed picture.

The relative position may be at least one of a fixed position within the first slice, a position changeable within the first slice, and a position changeable in a slice unit.

The discriminating of the coding parameter may include applying motion information of the referencing block as the coding parameter of the referencing block, and the adaptively coding, of the coding target block, may include coding the coding target block based on the motion information of the referencing block.

The coding parameter may include a luminance intra-prediction direction of the referencing block. When the referencing block is intra-coded, the coding target block may be coded to have the luminance intra-prediction direction of the referencing block, or coded to have only the luminance intra-prediction direction similar to the intra-prediction direction of the referencing block.

The coding parameter may include a motion vector, and the coding target block may be coded using a motion vector of the referencing block or corded only using a motion vector similar to the motion vector of the referencing block when the referencing block is inter-coded.

The coding parameter may include a reference picture index, and the coding target block may be coded using a reference picture index of the referencing block or coded only using a reference picture index similar to the reference picture index of the referencing block when the referencing block is inter-coded.

The coding parameter may include a prediction direction, and the coding target block may be coded in a prediction direction of the referencing block when the referencing block is inter-coded.

The referencing block may exist as a plurality, and when the plurality of referencing blocks is determined by a relative position or an absolute position within an picture, the discriminating of the coding parameter may include excluding, from the referencing block, a block positioned outside a boundary of the first slice, among the plurality of referencing blocks.

The video coding method may further include discriminating characteristics of the referencing block based on the coding parameter, and the coding target block may be adaptively coded based on the coding parameter when spatial redundancy is higher than temporal redundancy of the characteristics.

When a plurality of neighboring blocks, among the neighboring blocks of the coding target block, is intra-coded, the spatial redundancy may be determined to be higher than the temporal redundancy.

The coding mode of the coding may be determined as a coding mode selected according to competition between an adaptively coded mode and an adaptively uncoded mode.

The selected coding mode may be signaled to a decoder by a coding scheme indicator.

The video coding method may further include transmitting, to a decoder, a referencing block identifier with respect to which referencing block is selected.

According to another aspect of an exemplary embodiment, there is provided a video coding method, including: reconstructing a plurality of blocks within a first slice with respect to the first slice including the plurality of blocks; determining at least one block among the plurality of reconstructed blocks as a referencing block; discriminating a coding parameter of the referencing block; and adaptively decoding a decoding target block within the first slice based on the coding parameter.

The adaptively decoding of the decoding target block may include deducting omitted coding parameter information from the referencing block.

The omitted coding parameter information may be deducted from the referencing block using a referencing block identifier indicating which referencing block is selected.

According to another aspect of an exemplary embodiment, there is provided a video coding device, including: a storage unit to store data; a buffer to receive data with respect to a slice and blocks within the slice, and to store the received data; and a control unit to receive the data with respect to the slice and blocks within the slice from the buffer, to determine a referencing block, to discriminate a coding parameter of the referencing block, to discriminate characteristics of the referencing block, and to adaptively code a coding target block within the slice. Here, the storage unit may receive data required for an operation of the control unit from the control unit, and transmit the data stored in accordance with a request of the control unit to the control unit.

Effects of Invention

According to an embodiment, when coding a video, a coding parameter of a coding target block may be adaptively selected from a referencing block, thereby improving a video compression performance.

In addition, according to an embodiment, when spatial redundancy is higher than temporal redundancy due to local characteristics of a picture, a coding target block may be intra-coded, thereby improving a video compression performance.

BEST MODE FOR CARRYING OUT THE INVENTION

Figure 1:
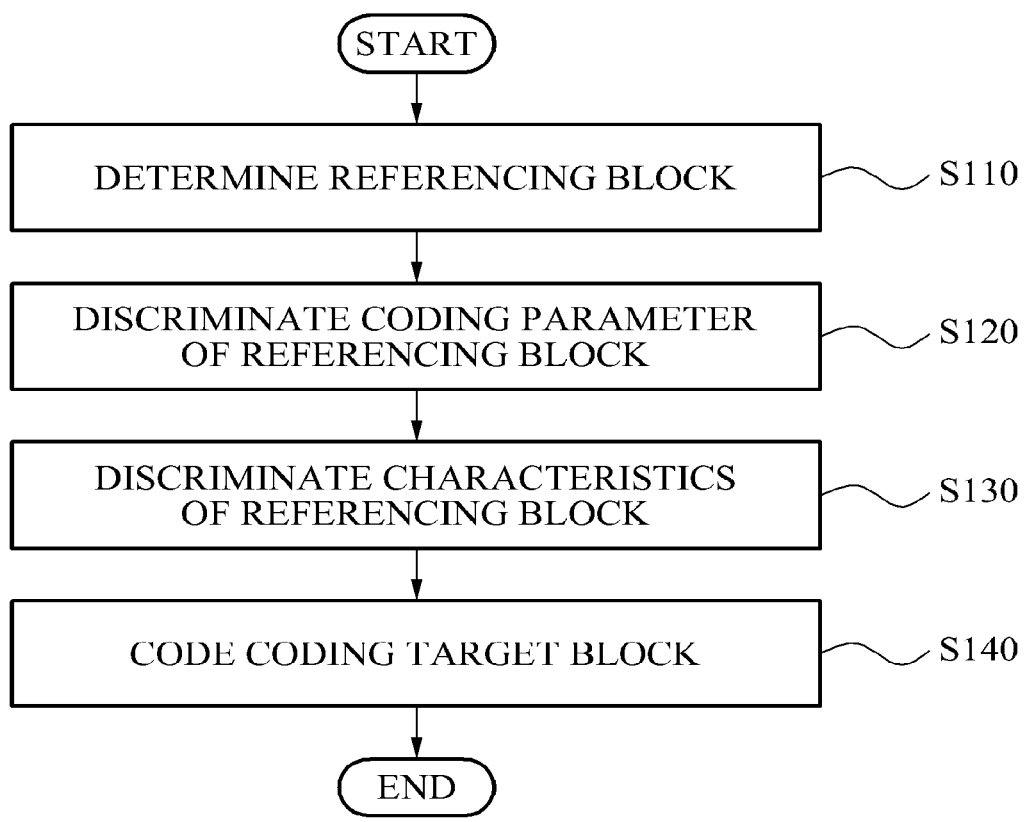
FIG. 1 is a flowchart illustrating a video coding method according to an embodiment of the present invention.

Terms used throughout the present specification are used to appropriately describe exemplary embodiments of the present invention, and thus may be different depending upon a user and an operator's intention, or practice of application fields of the present invention. Therefore, the tennis must be defined based on descriptions made through the present invention.

Although a few exemplary embodiments of the present invention have been shown and described, the present invention is not limited to the described exemplary embodiments, wherein like reference numerals refer to the like elements throughout.

When a plurality of neighboring blocks among neighboring blocks of a coding target block in a inter slice is intra-coded, spatial redundancy may be determined to be greater than temporal redundancy due to local characteristics of pictures. In this case, it may be more effective that the coding target block is intra-coded, and a video compression performance may be improved through this intra-coding.

Accordingly, when the spatial redundancy is greater than the temporal redundancy due to the local characteristics of the pictures in the inter slice, an adaptive intra-coding that depends upon a coding parameter of a neighboring block may be performed.

FIG. 1 is a flowchart illustrating a video coding method according to an embodiment of the present invention.

The video coding method may be used for coding a block within a slice. Hereinafter, a block to be a target of coding may be referred to as a current block, and a slice including the current block may be referred to as a current slice.

In embodiments of the present invention, the block may denote a unit of video coding and decoding.

In the video coding and decoding, the unit of the coding or the decoding may denote a segmented unit, when coding or decoding is performed, obtained by dividing a single picture into segmented blocks. Accordingly, the unit of the coding or the decoding may be referred to as a block, a macro block, a coding unit, a prediction unit, or the like. A single block may be further divided into lower blocks having a smaller size than that of the single block.

First, the current slice may include a plurality of blocks. Within the current slice, at least one reconstructed block may exist. The reconstructed block may be a block having been already reconstructed through operations S110 to S140, which will be described in detail. When the current block is reconstructed through the operations S110 to S140, which will be described, the current block may be one of the reconstructed blocks, for a next block which is a target of coding.

Thereafter, in operation S110, a referencing block for coding the current block may be determined.

At least one block, among the blocks of the current slice which have already been reconstructed, may be determined as the referencing block.

Figure 2:
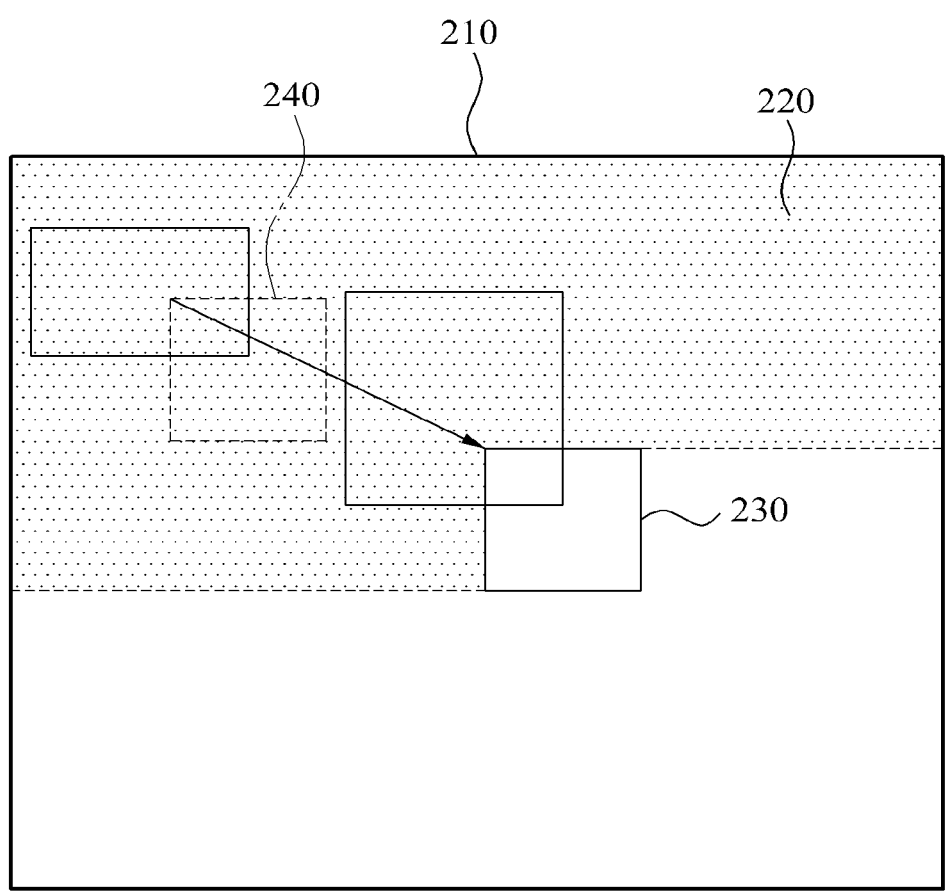
FIG. 2 is a diagram illustrating an example of a slice and a block to be a target of coding.

In FIG. 2, an example of reconstructed blocks 220 within the current slice 210, an example of a referencing block 240 which are selected from the reconstructed blocks, and a current block 230 are illustrated.

The referencing block may be determined based on pixel value similarity between blocks. The pixel value similarity may be measured by a measurement method of the pixel value similarity between blocks generally used in a video coding, such as a sum of absolute differences (SAD), a sum of absolute transformed difference (SATD), a sum of the squared differences (SSD), and the like. In this instance, a block having the highest pixel value similarity may be determined as the referencing block.

The pixel value similarity may be determined in a one-to-one scheme between the blocks. That is, the pixel value similarity may be determined in the one-to-one scheme between the reconstructed blocks and the current block.

The pixel value similarity may be determined in a one-to-many scheme between the blocks. A combination of weighted values of pixel values of the blocks and a different single block may become targets to be compared. That is, the pixel value similarity may be determined in a many-to-one scheme between the reconstructed blocks and the current block.

The pixel value similarity may be determined in a many-to-many scheme between the blocks. A combination of weighted values of pixel values of a plurality of blocks and a combination of weighted values of pixel values of a plurality of different blocks may become targets to be compared. That is, the pixel value similarity may be determined in the many-to-many scheme between the plurality of reconstructed blocks and the plurality of blocks including the current block.

The referencing block may be determined using coding parameter similarity between blocks.

The coding parameter may be information used for coding a picture, and may include respective examples with respect to an intra-prediction mode, an inter prediction mode, a motion vector, a reference picture index, a coded block pattern, a quantization parameter, a block size, block partition information, a macro block type, and the like, a statistical example, and a combined example thereof.

An inter coding mode and an inter prediction scheme may include a block matching algorithm, a P_SKIP mode, a B_SKIP mode, and a direct mode.

In this instance, the P_SKIP mode, the B_SKIP mode, and the direct mode may denote specific examples of methods in which motion information including the motion vector and a reference picture index is induced from an encoder and a decoder in the same manner when coding a specific block, and the induced motion information is used as motion information of a corresponding block. Embodiments of the present invention may be applied to a method in which motion information is induced from the encoder and the decoder in the same manner, and the motion information is used.

The intra-coding mode may include an intra 4×4 mode, an intra 8×8 mode, an intra 16×16 mode, and an intra 32×32 mode.

In this instance, the intra-coding mode may indicate a segmented size of an intra-coding block when performing an intra-coding. In the block having the respective segmented sizes, various intra-prediction schemes may be used.

The intra-prediction scheme may include a line prediction based on H.264/advanced video coding (AVC), a displaced intra-prediction (DIP), a template matching (TM), and a weighted line prediction.

An intra-prediction direction may include a line prediction direction based on the H.264/AVC and a weighted line prediction direction.

An inter macro block partition may indicate a size of a prediction block segmented when performing a prediction coding. The inter macro block partition may include 64×64, 64×32, 32×64, 32×32, 32×16, 16×32, 16×16, 16×8, 8×16, 8×8, 8×4, 4×8, and 4×4. The pixel value similarity may include a value measured by the SAD, the SATD, or the SSD.

The coding parameters within the referencing block may be directly used as a coding parameter of the current block to code the current block, or only a part thereof may be used.

Similarity of a coding parameter between the blocks may denote identity of a prediction type (for example, intra or inter), similarity of a prediction direction, similarity of a prediction mode, similarity of a block size, and the like. When using the same intra-prediction mode between blocks, or using motion vectors having a similar size, or using the same quantization parameter, the same block size, or the same block partition information, similarity of the coding parameter between the blocks may be determined to be high.

The similarity of the coding parameter between the blocks may be determined by a combination of at least one parameter among the coding parameters. Also, the referencing block may be determined using an equation calculated from the coding parameters of the plurality of selected referencing blocks.

A result obtained through the equation using the combination of the coding parameters of the selected referencing blocks may be determined as a coding parameter of a virtual block, and the virtual block may be determined as the referencing block.

To determine the referencing block, the current block and a block having a high similarity of a pixel value, from among the reconstructed blocks of the current slice, may be determined as the referencing block, so that a displaced inter-prediction scheme using the pixel value of the referencing block as the pixel value of the current block may be used.

To determine the referencing block, a template matching method in which a pixel value similarity between neighboring pixels of reconstructed blocks of the current slice and pixel values of reconstructed pixels, neighboring the current block, is discriminated to determine a block having a higher pixel value similarity compared to the referencing block, may be used.

When the DIP or the TM is used to predict a pixel value in the current slice through the intra-coding blocks, an intermediate value with respect to a displacement vector of the coding blocks through the DIP or the TM may be predicted, and a result of the prediction may be determined as a coding parameter of the virtual block.

When coding the current block, the DIP or the TM may be used directly, and the referencing block, among the reconstructed blocks, may be determined using the method above or the following method.

In addition, in a case where inter-coding blocks use a motion prediction (or, a block matching algorithm) of predicting a pixel value from the previous slice, when an intermediate value with respect to the motion vector of the coded block is predicted, a result obtained through the prediction of the intermediate value may be determined as the coding parameter of the virtual block. The virtual block may be determined as the referencing block.

The referencing block may be determined in accordance with an absolute position within a picture, and or determined in accordance with a relative position with respect to the current block.

When the referencing block is determined, in accordance with the relative position with respect to the current block, a decoded block most adjacent to the current block may be determined as the referencing block. In this instance, as the referencing block with respect to the current block, at least one block among the decoded blocks most adjacent to the current block may be determined as the referencing block.

For example, the relative position with respect to the current block may denote a position of the reconstructed block adjacent to the current block. That is, a reconstructed block abutting a boundary of the current block may be referred to as an adjacent reconstructed block.

Figure 4:
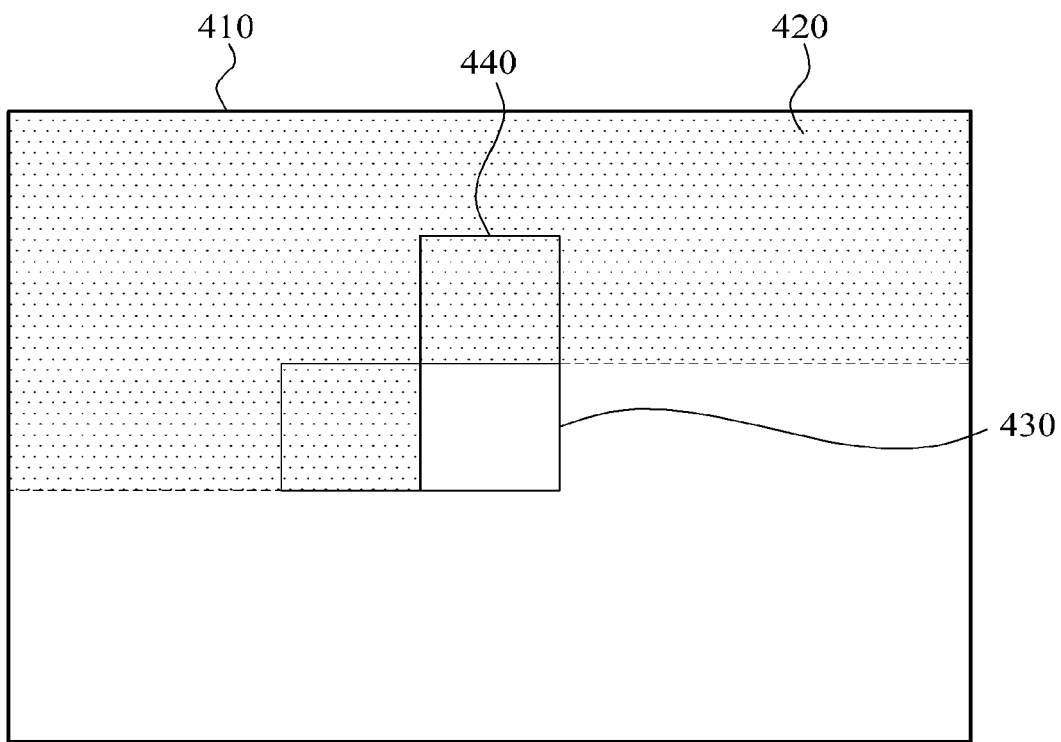
FIG. 4 is a diagram illustrating reconstructed blocks within a current slice, a referencing block among the reconstructed blocks, and a current block, according to an embodiment of the present invention.

In FIG. 4, an example of reconstructed blocks 420 within a current slice 410, an example of a referencing block 440 among the reconstructed blocks 420, and a current block 430 are illustrated.

Figure 5:
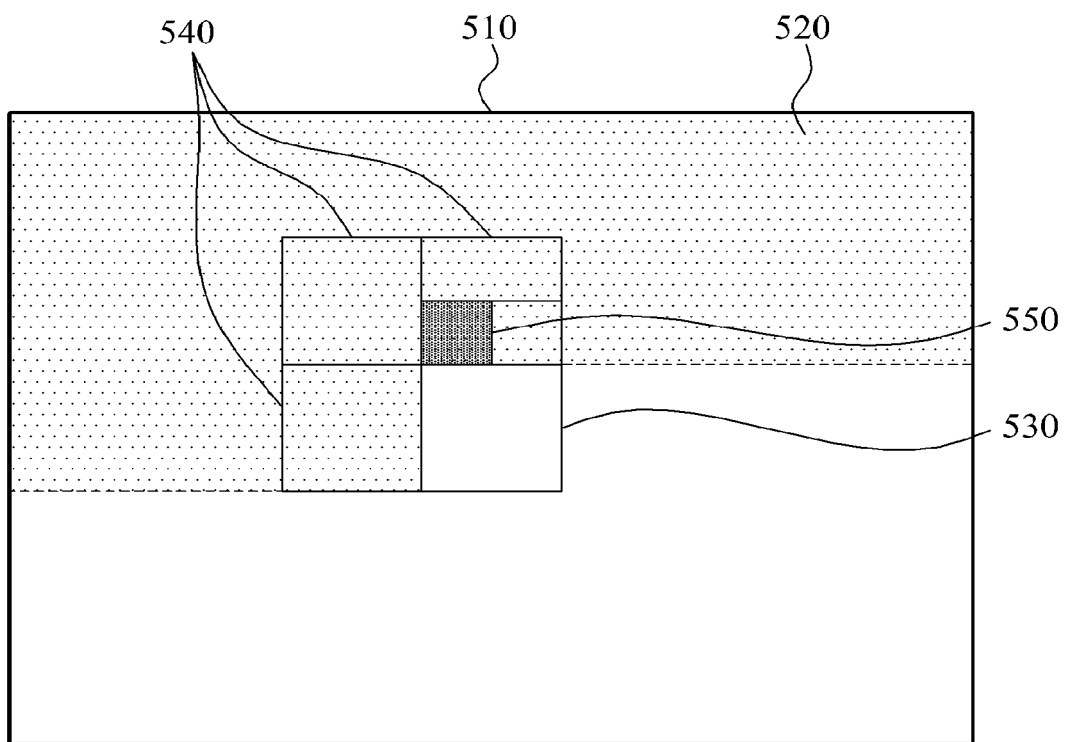
FIG. 5 is a diagram illustrating reconstructed blocks within a current slice, a plurality of referencing blocks among the reconstructed blocks and one referencing block among the plurality of referencing blocks, and a current block according to an embodiment of the present invention.

In FIG. 5, an example of reconstructed blocks 520 within a current slice 510, an example of a plurality of referencing blocks 540 among the reconstructed blocks 520, and an example of a single referencing block 550 among the plurality of referencing blocks 540 and a current block 530 are illustrated.

In addition, when the referencing block is determined, in accordance with the relative position with respect to the current block, a reconstructed block to which a block position within a picture corresponds may be determined as the referencing block.

In this instance, when a current block position within a picture and a referencing block position within a previously reconstructed picture are the same, the block positions within the picture of the both blocks may correspond to each other. When the referencing block within the previously reconstructed picture has the same block position as that of the current block, the referencing block within the previously reconstructed picture may be referred to as a collocated block.

Figure 6:
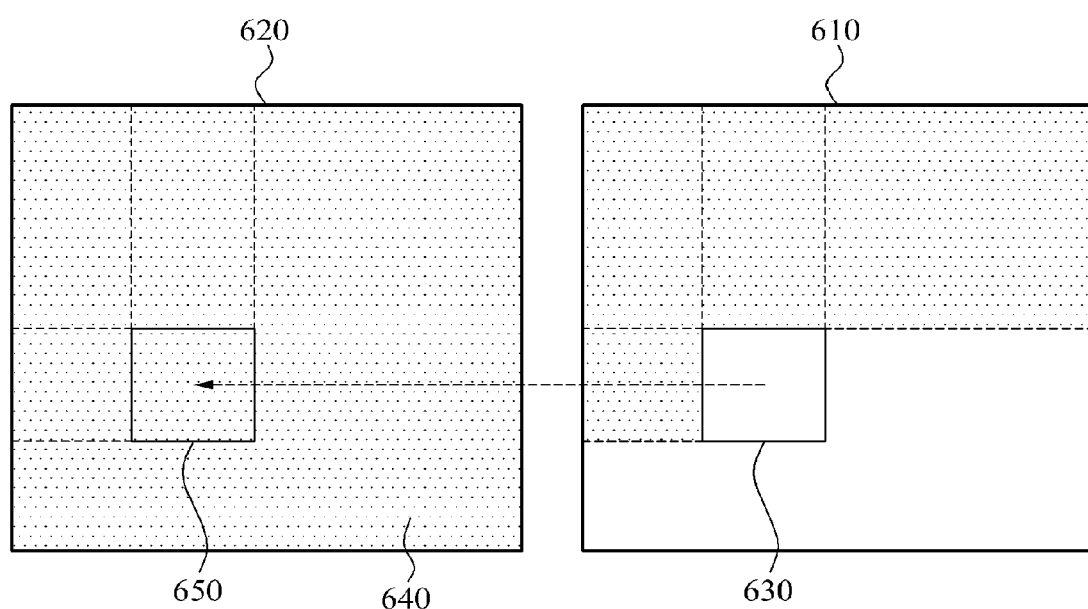
FIG. 6 is a diagram illustrating a current block within a current picture, reconstructed blocks within a previously reconstructed picture, a referencing block.

In FIG. 6, an example of a current block 630 within a current picture 610, and an example of reconstructed blocks 640 within a previously reconstructed picture 620 and a referencing block 650 are illustrated.

The relative position may be fixed within a single slice, or changed. The relative position may be changed in a slice unit.

The referencing block may be determined using at least one of the above described pixel value similarity, the coding parameter similarity, the calculated equation, the absolute position, and the relative position.

When an adaptive skip mode is used, a block existing in a specific relative position with respect to the current block may be determined as the referencing block. In this instance, based on correlation within a picture, a decoded block most adjacent to the current block may be determined as the referencing block.

Next, in operation S120, a coding parameter of the referencing block may be discriminated.

First, whether the referencing block is intra-coded or inter-coded may be determined.

When a single block is determined as the referencing block in operation S110 of the determining of the referencing block, only a coding parameter of the block may be discriminated, and when a plurality of blocks are determined as the referencing block, the same coding parameter or a similar coding parameter among the referencing blocks may be discriminated.

When the referencing block is intra-coded, an intra-coding mode, a luminance intra-prediction direction, a luminance intra-prediction scheme, a chrominance intra-prediction direction, a chrominance intra-prediction scheme, a transform method, a displaced vector, a coded block pattern, presence and absence of a residual signal, a coefficient scan method, and the like may be included as a coding parameter to be coded.

When the referencing block is inter-coded, an inter coding mode, an inter macro block partition, a motion vector, a reference picture list, a reference picture list, a prediction direction, an adaptive interpolation filter, presence and absence of a residual signal, a coefficient scan method, and the like may be included as the coding parameter to be discriminated.

In operation S110 of determining of the referencing block, when the referencing block is determined by a relative position or an absolute position within a picture, a part of the referencing block may be positioned outside a boundary of a picture or a slice. The referencing block positioned outside the boundary may be excluded from the discriminating of the coding parameter.

When a specific coding method is used, operation S120 of the discriminating of the coding parameter may be omitted.

For example, when a coding method performed by excluding only motion information is applied to the current block, operation S120 of the discriminating of the coding parameter may be omitted. (Otherwise, in operation S120 of discriminating of the coding parameter, motion information of the referencing block may be determined as the coding parameter of the referencing block)

In addition, to code the current block, when the referencing block is determined in operation S110, the motion information of the referencing block may be applied to the current block, whereby the current block may be coded in operation S140.

Whether the determined referencing blocks are intra-coded or inter-coded in an adaptive skip mode may be discriminated, whether the determined referencing blocks exist outside a boundary of a picture and a slice may be discriminated, and then a coding parameter of the referencing block may be discriminated.

Next, in operation S130, characteristics of the referencing block may be discriminated based on the coding parameter of the referencing block.

When a spatial redundancy of the characteristics of the referencing block is discriminated to be higher a temporal redundancy, the current block may be adaptively coded based on the coding parameter.

When a plurality of neighboring blocks of the current block in an inter slice are intra-coded, the spatial redundancy may be determined to be higher than the temporal redundancy due to local characteristics of a picture.

When a specific coding method is used, operation S130 of discriminating of the characteristics of the referencing block may be omitted.

For example, when the coding method performed by excluding only the motion information is applied to the current block, operation S120 of discriminating of the coding parameter and operation S130 of discriminating of the characteristics of the referencing block may be omitted. When the referencing block is determined to code the current block in operation S110, the current block may be coded by applying the motion information of the referencing block to the current block in operation S140.

Next, the current block may be adaptively coded using the discriminated coding parameter of the referencing block in operation S140.

A specific coding or decoding may be performed on specific signaling information in accordance with the parameter, or the signaling information may be defined as a specific semantic.

For example, when having a coding parameter in which at least one of referencing blocks A, A', and A" satisfies a condition B, a syntax C of the current block may be defined to have a semantic D, or to perform a decoding process E. When having a coding parameter in which at least one of referencing blocks A, A', and A" satisfies a condition B', the syntax C of the current block may be determined to have a semantic D' or to perform a decoding process E'. In this case, the syntax may be a factor of a bit stream, and denote a syntax element or a sentence element.

When the referencing block is intra-coded, only the intra-coding may be performed on the current block. The syntax required for inter-coding and the semantic and decoding process may be used to intra-coding.

An example of an intra-coding of the current block in accordance with the coding parameter of the referencing block will be described in the following Table 1.

TABLE 1

| Coding parameter of referencing block | Coding of current block |
| --- | --- |
| Intra-coding mode | Syntax required for inter-coding is used to increase and signal an intra-coding mode. Semantic is defined as semantic with respect to intra-coding mode, and decoding process is defined as decoding process with respect to the intra-coding mode. Syntax required for inter-coding is used to increase and signal intra macro block partition. Semantic is defined as semantic with respect to intra macro block partition, and decoding process is defined as decoding process with respect to macro block partition. Syntax required for inter coding is used to increase and signal intra-prediction direction. Semantic is defined as semantic with respect to intra-prediction direction, and decoding process is defined as decoding process with respect to the intra-prediction direction. |

TABLE 1-continued

| Coding parameter of referencing block | Coding of current block |
| --- | --- |
| | When a referencing block is intra-coded, current block is coded to an intra-coding mode of the referencing block in accordance with the intra-coding mode of the referencing block. When a current block is coded to the intra-coding mode of the referencing block, the intra-coding mode of the referencing block is used as the intra-coding mode of the current block. Accordingly, intra-coding mode of current block may not be signaled to a decoder, thereby improving coding performance. |
| Luminance and chrominance intra-prediction direction | When a referencing block is intra-coded, coding may be performed to have a luminance intra-prediction direction of the referencing bock, or the coding may be performed to have the luminance intra-prediction direction similar to the intra-prediction direction of referencing block. When coding current block to have the luminance intra-prediction direction of referencing block, the luminance intra-prediction direction of the referencing block are used as the intra-prediction direction. Accordingly, the luminance intra-prediction direction the current block are not signaled to a decoder, thereby improving coding performance. |
| Residual signal | When a residual signal of a referencing block is not coded, the residual signal of a current block may not be coded. Bit required for coding a coded block pattern (CBP), that is, syntax may be saved. In this instance, based on whether to code the residual signal of the referencing block, the CBP of current block is not signaled, and the residual signal is not signaled, thereby improving coding performance of the current block. |

When the intra-coding method of the current block, in accordance with the coding parameter of the referencing block, is used in an encoder, a decoder may deduct the omitted coding parameter information from the referencing block, and the coding parameter information omitted from the current block may be appropriately used, by applying the deducted information to a current coding target block. In this instance, a decoder may transmit, to the decoder, a referencing block identifier, indicating that which referencing block is selected, as necessary, and may deduct the omitted coding parameter information from a corresponding referencing block.

Figure 7:
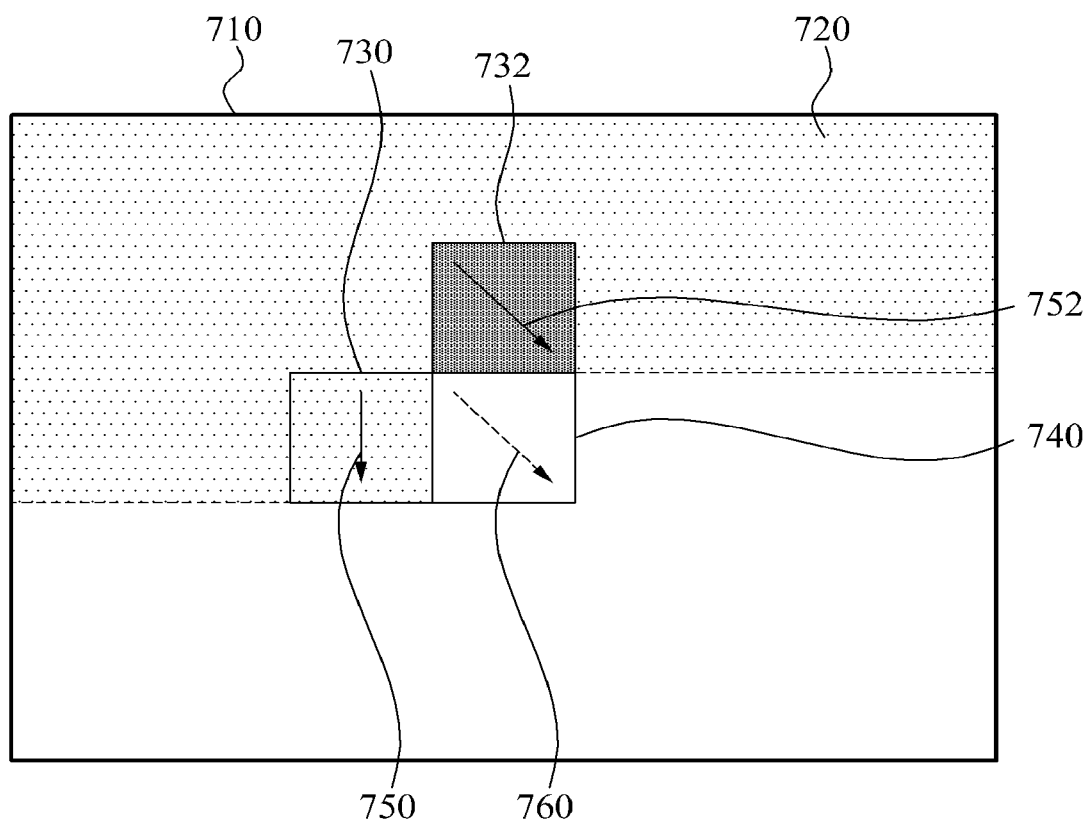
FIG. 7 is a diagram illustrating an intra-coding of a current block, in accordance with luminance and chrominance intra-prediction direction of a referencing block, according to an embodiment of the present invention.

In FIG. 7, an example of an intra-coding of the current block in accordance with luminance and chrominance intra-prediction direction of the referencing block is illustrated.

Figure 8:
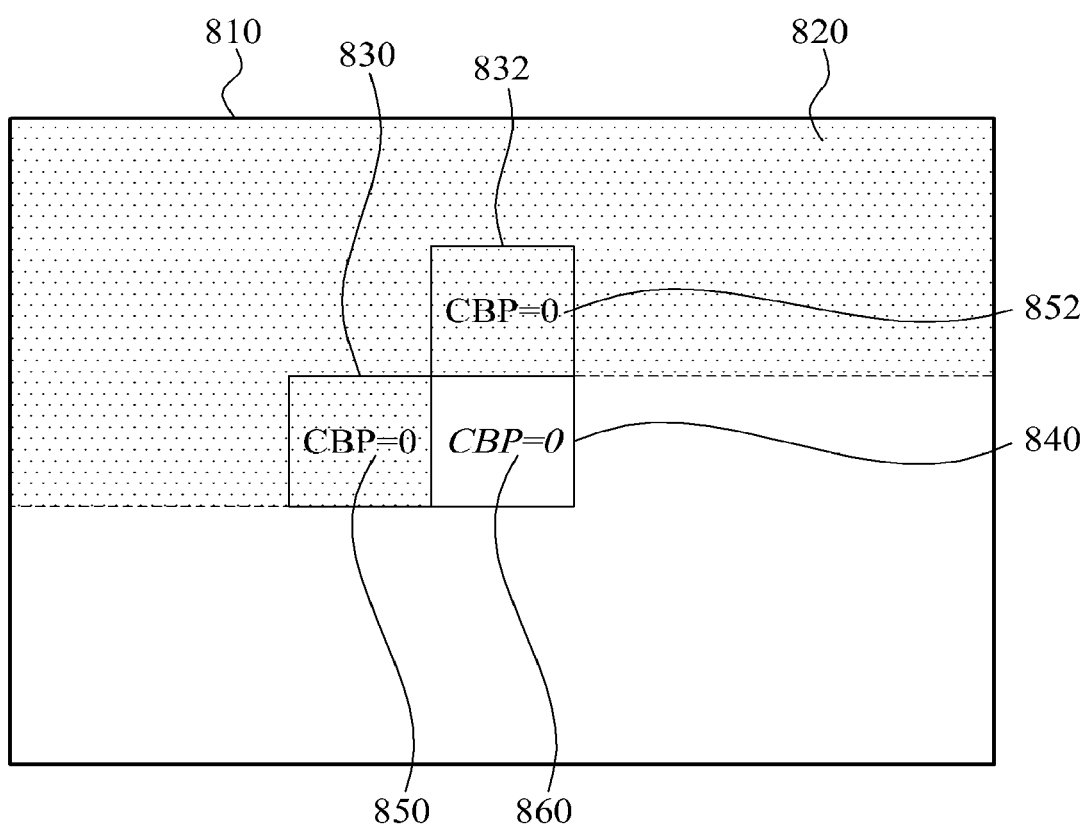
FIG. 8 is a diagram illustrating an example of an intra-coding of a current block, in accordance with presence and absence of a residual signal of a referencing block, according to an embodiment of the present invention.

In FIG. 8, an example of an intra-coding of the current block, in accordance with presence and absence of a residual signal of the referencing block, is illustrated.

When the referencing block is inter-coded, only an inter-coding may be performed on the current block. A syntax, a semantic, and a decoding process which are required for the intra-coding may be used for the inter-coding.

An example of the inter-coding of the current block, in accordance with the coding parameter of the referencing block, is illustrated in the following Table 2.

TABLE 2

| Coding parameter of referencing block | Coding of current block |
|---|---|
| Inter-coding mode | Syntax required for intra-coding is used to increase and signal inter-coding mode. A semantic is defined as a semantic with respect to inter coding mode, and a decoding process is defined as the decoding process with respect to the inter-coding mode.<br>A syntax required for the intra-coding is used to increase and signal inter-macro block partition. The semantic is defined as the semantic with respect to the inter-macro block partition, and the decoding process is defined as the decoding process with respect to the macro block partition. The syntax required for the intra-coding is used to increase and the signal inter-prediction scheme. The semantic is defined as the semantic with respect to the inter-prediction scheme, and the decoding process is defined as the decoding process with respect to the inter-prediction scheme.<br>When a referencing block is inter-coded, a current block is coded to the inter-coding mode of the referencing block in accordance with the inter-coding mode of the referencing block. When coding the current block to the inter-coding mode of the referencing block, the inter-coding mode of the referencing block is used as the inter-coding mode of the current block. Accordingly, the inter-coding mode of the current block may not be signaled to a decoder, thereby improving coding efficiency.<br>When the referencing block is inter-coded, the current block is coded to the inter macro block partition of the referencing block in accordance with the inter macro block partition of the referencing block. Also, the current block may be coded only to the inter macro block partition, having a macro block partition similar to the inter macro block partition. When the current block is coded to the inter macro block partition of the referencing block, the inter macro block partition of the referencing block is used as the inter macro block partition of the current block. Accordingly, the inter macro block partition of the current block may not be signaled to the decoder, thereby improving coding efficiency. |
| Motion vector | When the referencing block is inter-coded, the current block is coded to a motion vector of the referencing block in accordance with the motion vector of the referencing block. Also, the current block may be coded only to the motion vector (that is, a size difference between both the motion vectors is not great) similar to the motion vector. When the current block is coded to the motion vector of the referencing block, the motion vector of the referencing block is used as the motion vector of the referencing block. Accordingly, the motion vector of the current block may not be signaled to a decoder, thereby improving coding efficiency. |
| Reference picture index | When a referencing block is inter-coded, a current block is coded to a reference picture index of the referencing block in accordance with the reference picture index of the referencing block. Also, the current block may be coded only to the reference picture index (that is, the size difference between the reference picture indices is not great) similar to the reference picture index. When the current block is coded to the picture index of the referencing block, the reference picture index of the referencing block is used as the reference picture index of the current block. Accordingly, the reference picture index of the current block is not signaled to a decoder, thereby improving coding efficiency. |
| Reference picture list | When a referencing block is inter-coded, a current block is coded to a reference picture list in accordance with a reference picture list of the referencing block. When the current block is coded to the reference picture list in accordance with the reference picture list of the referencing block. When the current block is coded to the reference picture list of the referencing block, the reference picture list of the referencing block is used as the reference picture list of the current block. Accordingly, the reference picture list of the current block may not be signaled, thereby improving coding efficiency. |
| Prediction direction | When a referencing block is inter-coded, a current block is coded in a prediction direction of a referencing block in accordance with a prediction direction of the referencing block. When the current block is coded in the prediction direction of the referencing block, the prediction direction of the referencing block is used as the prediction direction of the referencing block. Accordingly, the prediction direction of the current block may not be signaled to a decoder, thereby improving coding efficiency. |
| Interpolation filter | When a referencing block performs motion prediction/interpolation of a referencing block using a specific interpolation filter, a motion prediction/interpolation of a current block is performed using a corresponding interpolation filter in accordance with a form and a type of an interpolation filter of the referencing block, and coding may be performed. |
| Residual signal | When a residual signal of a referencing block is not coded, the residual signal of the current block may not be coded. Bit required for coding a CBP, that is, syntax may be saved. In this instance, with respect to current block, the CBP of the current block may not be signaled in accordance with whether to perform coding of the residual signal of the referencing block, and the residual signal is not coded, thereby improving coding efficiency. |

When an encoder uses an inter-coding method of the current block, in accordance with a coding parameter of the referencing block, a decoder may deduct the omitted coding parameter information from the referencing block. The decoder may appropriately use the coding parameter information omitted from the current block by applying the deducted information from the current decoding target block.

In this instance, as necessary, the encoder may transmit to the decoder, a reference block identifier (or including information about which referencing block is selected) indicating which referencing block is selected. By using the reference block identifier, the decoder may deduct the omitted coding parameter information from the identified referencing block.

Figure 9:
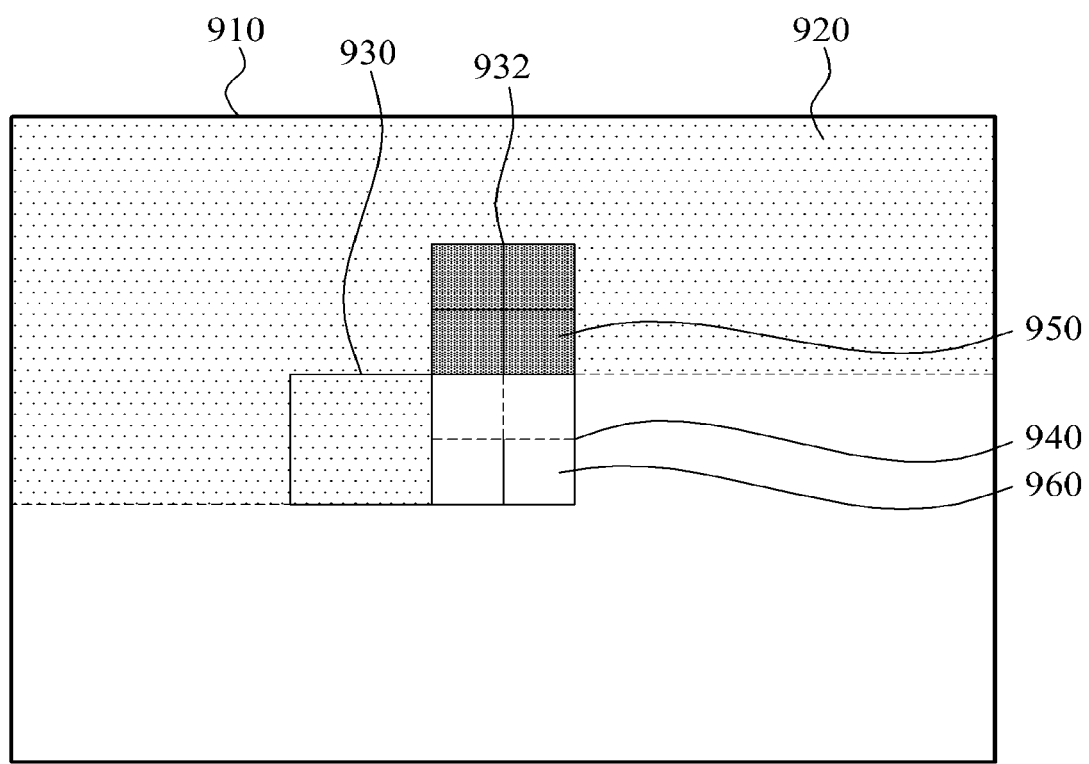
FIG. 9 is a diagram illustrating an inter-coding of a current block, in accordance with an inter macro block partition of a referencing block, according to an embodiment of the present invention.

In FIG. 9, an example of an inter-coding of the current block, in accordance with an inter macro block partition of the referencing block, is illustrated.

Figure 10:
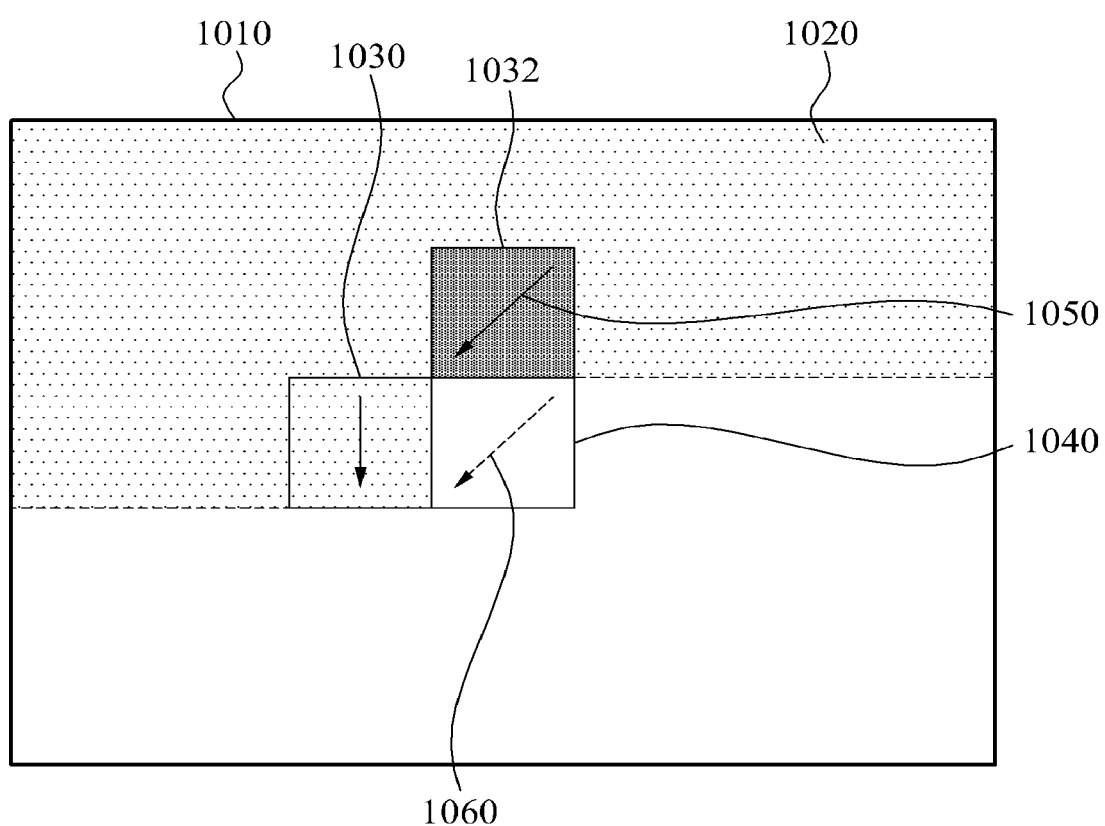
FIG. 10 is a diagram illustrating an inter-coding of a current block, in accordance with a motion vector of a referencing block, according to an embodiment of the present invention.

In FIG. 10, an example of an inter-coding of the current block, in accordance with a motion vector of the referencing block, is illustrated.

Figure 11:
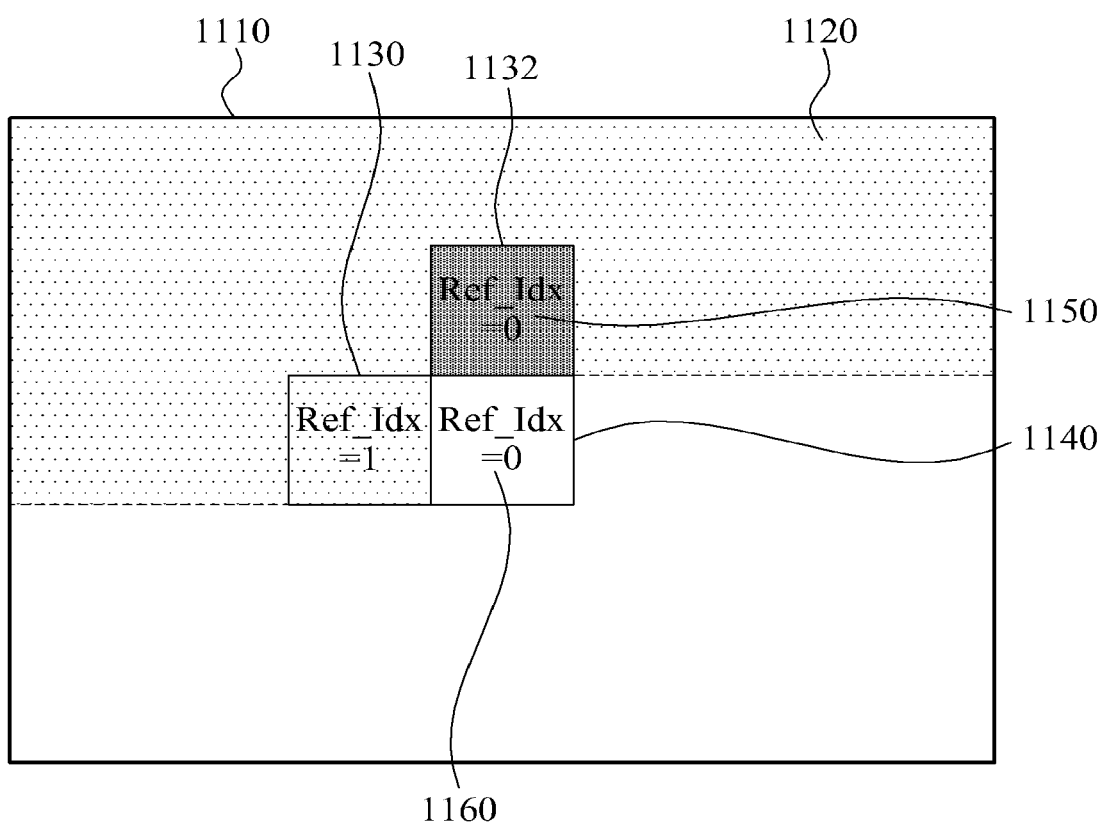
FIG. 11 is a diagram illustrating an inter-coding of a current block, in accordance with a reference picture index of a referencing block, according to an embodiment of the present invention.

In FIG. 11, an example of an inter-coding of the current block, in accordance with the reference picture index of the referencing block, is illustrated.

Figure 12:
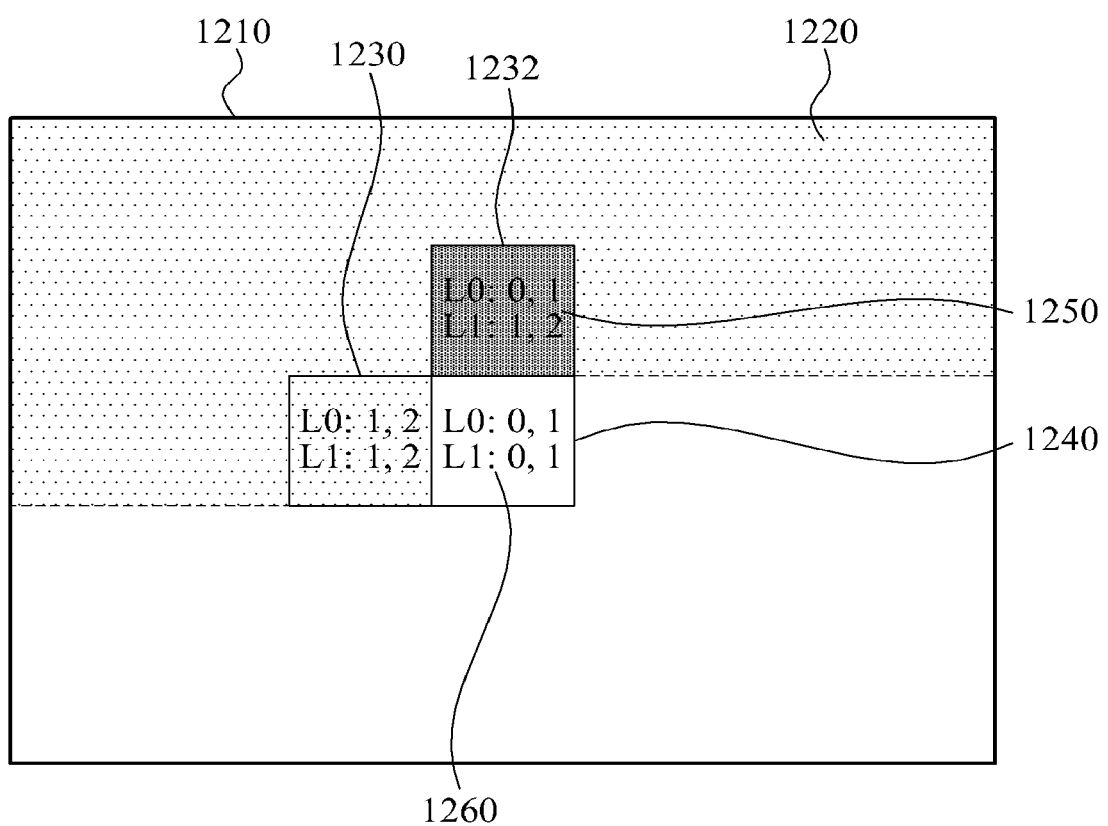
FIG. 12 is a diagram illustrating an inter-coding of a current block, in accordance with a reference picture list of a referencing block, according to an embodiment of the present invention.

In FIG. 12, an example of an inter-coding of the current block, in accordance with the prediction direction of the referencing block, is illustrated.

Figure 13:
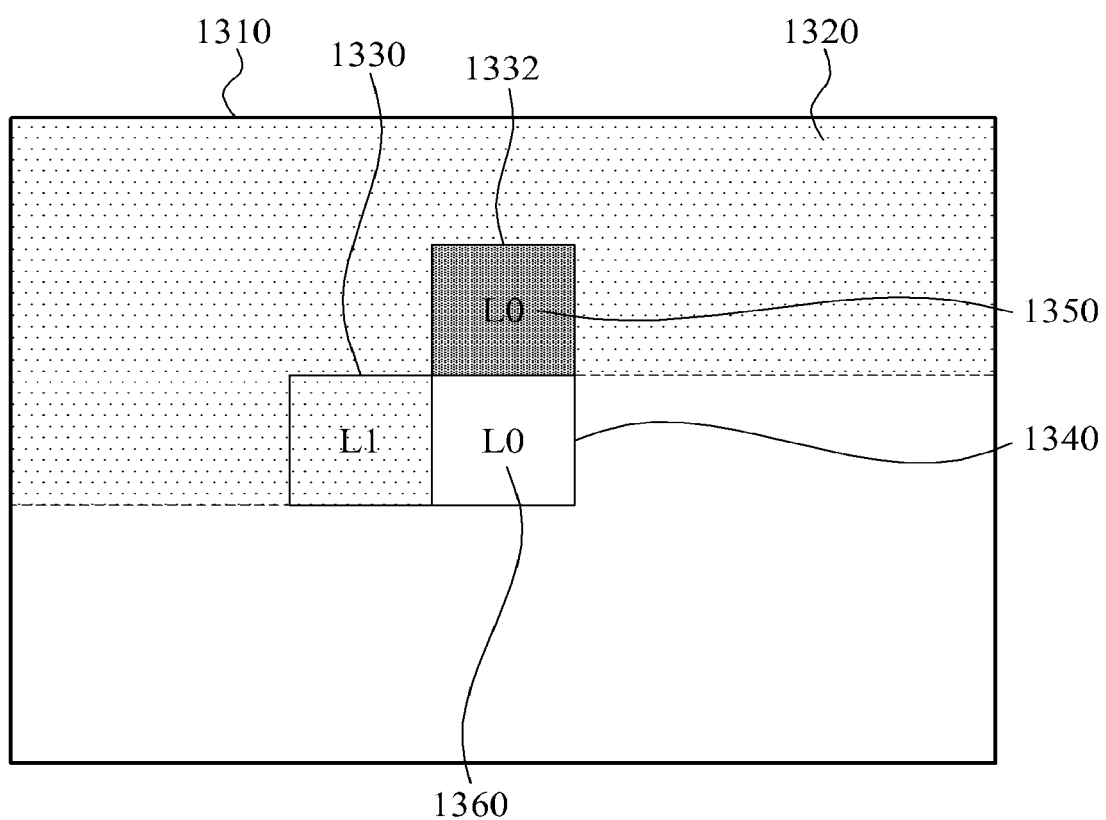
FIG. 13 is a diagram illustrating an inter-coding of a current block, in accordance with a prediction direction of a referencing block, according to an embodiment of the present invention.

In FIG. 13, an example of an inter-coding of the current block, in accordance with a prediction direction of the referencing block, is illustrated.

A linear combination of pixel values within the referencing blocks may be used as the prediction block of the current block.

When having a coding parameter in which at least one of referencing blocks A, A', and A" satisfies a condition B, a prediction block G of the current block may be generated by a linear combination according to the following Equation 1.

$$G_{=a*F+b*F'}$$

Equation 1

Here, the prediction block F may be a pixel value of the referencing block. The prediction block F may be a prediction block generated by a coding parameter of the current block. In this instance, each of a and b is a weight.

In accordance with a reconstructed pixel value of the referencing block and a coding parameter of the current block, a prediction block G may be generated by a sum of weights. The generated prediction block G may be used as the prediction block of the current block.

A limited candidate mode set may be used as a parameter capable of coding the current block. When having a coding parameter in which at least one of referencing blocks A, A', and A" satisfies a condition B, a parameter capable of coding the current block may be limited as a candidate mode set C. The above set may include a macro block type, a sub macro block type, an inter macro block partition, a motion vector, a reference picture index, a reference picture list, a prediction direction, and the like.

For example, when the referencing block is intra-coded, and the current block is intra-coded, the coding parameter of the current block may be limited as a coding parameter within a picture.

The limitation may eliminate a syntax, a semantic, and a decoding process which are used for an inter-coding parameter, thereby improving coding efficiency.

A coding mode of the current block may be determined as an optimum coding mode in accordance with competition.

For example, when having a coding parameter in which at least one of referencing blocks A, A', and A" satisfies a condition B, the current block may be coded to an optimized coding mode determined through competition in a rate-distortion optimization view, a distortion view, and a rate view between modes adaptively coded in accordance with 1) a syntax, a semantic, and a decoding process of an existing coding parameter and 2) the referencing block.

In addition, competition between a mode that is adaptively coded in accordance with the coding parameter of the referencing block and a mode that is not adaptively coded may be performed A coding mode of the current block may be selected through the competition.

In this case, additional coding scheme indicator and a syntax with respect to whether the current block is coded to the first coding mode (that is, adaptive coding mode in accordance with a coding parameter of the referencing block) or to the second coding mode (that is, non-adaptive coding mode) may be transmitted to the decoder. The decoder may decode the current block to an appropriate mode using the transmitted additional coding scheme indicator and the syntax.

That is, either an adaptive coding method using the coding parameter of the referencing block or a non-adaptive coding method without using the coding parameter of the referencing block which is suitable for the coding may be selected. Information about the selected method (that is, coding mode) may be signaled to the decoder.

For example, a coding scheme showing a minimum rate-distortion cost in a view of the rate-distortion may be selected in the encoder. In addition, so that the selected coding scheme is decoded in the decoder, a coding scheme indicator with respect to the selected coding scheme may be transmitted to the decoder.

The coding mode of the current block may have an additional syntax, a semantic, and a decoding process in accordance with a condition of a coding parameter of the referencing block.

For example, when having a coding parameter in which at least one of the referencing blocks A, A', and A" satisfies a condition B, the coding mode of the current block may have an additional syntax C, a semantic D with respect to C, and a decoding process E with respect to the C.

The coding mode of the current block may have an additional syntax, a semantic, and a decoding process, regardless of the coding parameter of the referencing block.

For example, regardless of the coding parameter of the referencing block, the coding mode of the current block may have the additional syntax C, the semantic D with respect to C, and a decoding process E with respect to C.

When the coding mode of the current block is coded in a skip scheme, an example of a prediction method of an inter-prediction block is illustrated in the following Table 3.

TABLE 3

| parameter | Usage method of prediction block |
| --- | --- |
| Reference picture index | A Syntax, a semantic, and a decoding process with respect to a reference picture index are added to a coding mode of a current block, and an inter-prediction block is predicted from a referencing block. In accordance with a reference picture index of any one of the referencing blocks, and the inter-prediction block may be predicted from a referencing picture by a reference picture index of the referencing block. |
| Motion vector | A Syntax, a semantic, and a decoding process with respect to a motion vector are added to a coding mode of a current block, and an inter-prediction block is predicted from the motion vector. |

Accordingly, when the current block is included in an inter slice, and at least one of the referencing blocks is intra-coded, the coding mode of the current block is an inter-coding mode, however, has the motion vector and the reference picture index. In this case, the prediction block of the current block may be generated by a sum of 1) weights of intra-prediction blocks generated from an intra-coding parameter of the current block and 2) weights of inter-prediction blocks generated from the motion vector and the reference picture index among inter-coding parameters of the current block.

In a case where the adaptive skip mode is used, when the current block is coded to a P_SKIP mode, a B_SKIP mode, or a direct mode in an inter slice, the current block may be adaptively coded in accordance with a coding parameter of the referencing block.

For example, a part or whole of the referencing block is intra-coded, an example of the coding method of the current block is illustrated in the following Table 4.

TABLE 4

| Parameter of current block | Usage method of prediction block |
|---|---|
| Coding mode | A coding mode of a current block is signaled to a P_SKIP mode or a B_SKIP mode, however, an intra-coding mode of a referencing block is directly used, and an intra-coding mode most similar to an intra-coding mode of a referencing block. The coding mode of the current block is signaled to the P_SKIP mode or to the B_SKIP mode, however, the current block is intra-coded using a reconstructed pixel of the referencing block. |
| Intra-prediction direction | A coding mode of a current block is signaled to a P_SKIP mode or a B_SKIP mode, however, an intra-prediction direction of the current block is directly used as an intra-prediction direction of a referencing block, and otherwise a prediction direction most similar to the intra-prediction direction of the referencing block may be used. |
| Residual signal | A coding mode of a current block is signaled to a P_SKIP mode or a B_SKIP mode, however, a residual signal of a current block is coded or is not coded in accordance with the presence or absence of the residual signal of the referencing block |

FIG. 2 is a diagram illustrating reconstructed blocks within a current slice, and a referencing block and a current block selected from the reconstructed blocks.

The reconstructed blocks 220 within the current slice 210, and the referencing block 240 and the current block 230 selected from the reconstructed blocks 220 are illustrated.

Figure 3:
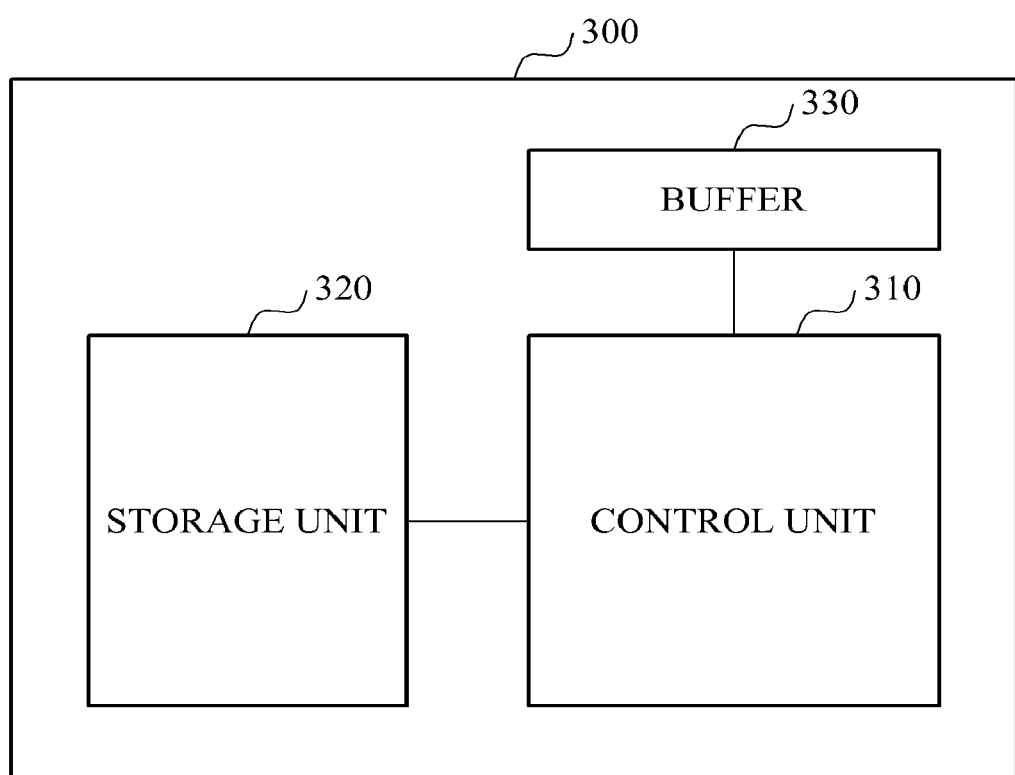
FIG. 3 is a diagram illustrating a video coding device according to an embodiment of the present invention.

FIG. 3 is a diagram illustrating a video coding device according to an embodiment of the present invention.

The video coding device 300 may include a control unit 310, a storage unit 320, and a buffer 330.

The control unit 310 may receive, from the buffer 330 and the storage unit 320, a slice and data with respect to blocks within the slice. The control unit 310 may perform determining of the referencing block, discriminating of the coding parameter of the referencing block, discriminating of characteristics of the referencing block, and an adaptive coding of the current block. The control unit 310 may store, in the storage unit 320, data required for performing the determining, the discriminating, and the coding.

The storage unit 320 may receive, from the control unit 310, data required for operating the control unit 310. The storage unit 320 may transmit, to the control unit 310, the stored data in response to a request of the control unit 310.

In addition, the buffer 330 may receive the slice and the data with respect to the blocks within the slice from the outside, and store the received data.

The device is not limited only to the coding method, and may be applied to an adaptive decoding method in accordance with the coding method using the coding operations in the decoder having the same purpose as that of the coding process.

FIG. 4 is a diagram illustrating reconstructed blocks within a current slice, a referencing block among the reconstructed blocks and a current block according to an embodiment of the present invention.

Reconstructed blocks 420 within the current slice 410, a referencing block 440 among the reconstructed blocks 420, and a current block 430 are illustrated.

FIG. 5 is a diagram illustrating reconstructed blocks within a current slice, a plurality of referencing blocks among the reconstructed blocks, and a single referencing block among the plurality of referencing blocks and a single current block are illustrated.

Reconstructed blocks 520 within a current slice 510 is illustrated, and a plurality of referencing blocks 540 among the reconstructed blocks 520 are illustrated. In addition, a single referencing block 550 among the plurality of referencing blocks 540 and a single current block 530 are illustrated.

FIG. 6 is a diagram illustrating a current block within a current picture, reconstructed blocks within a previously reconstructed picture, and a referencing block.

A current block 630 within a current picture 610, and reconstructed blocks 640 within a previously reconstructed picture 620 are illustrated. In addition, a referencing block 650 among the reconstructed blocks 640, the current block 630.

FIG. 7 is a diagram illustrating coding within a picture of a current block in accordance with a luminance and chrominance intra-prediction direction of a referencing block according to an embodiment of the present invention.

Reconstructed blocks 720 within a current slice 710, referencing blocks 730 and 732 among the reconstructed blocks 720, and a current block 740 are illustrated.

Luminance and chrominance intra-prediction directions 750 and 752 of the referencing blocks 730 and 732 are illustrated, and a luminance and chrominance intra-prediction direction 760 of the current block 740 are illustrated.

A luminance and chrominance intra-prediction direction 752 of an upper block 732 among the referencing blocks 730 and 732 may be used as a luminance and chrominance intra-prediction direction 760 of the current block 740. That is, the current block 740 may be coded in accordance with the luminance and chrominance intra-prediction direction 752 of the upper block 732.

A luminance and chrominance intra-prediction direction 760 may not be transmitted to the decoder. In this instance, information indicating that a referencing block of the current block 740, in the upper block 752, may be transmitted to the decoder through a reference block identifier. The decoder may identify information indicating that the upper block 732 is the referencing block of the current block 740.

FIG. 8 is a diagram illustrating an example of an intra-coding of a current block in accordance with the presence and absence of a residual signal of a referencing block according to an embodiment of the present invention.

Reconstructed blocks 820 within a current slice 810, referencing blocks 830 and 832 among the reconstructed blocks 820, a current block 840, presence and absence 850 and 852 of a residual signal of the referencing blocks 830 and 832, and presence and absence 860 of a residual signal of the current block are illustrated.

Residual signals of all of the referencing blocks 830 and 832 may not be coded. Accordingly, the current block 840 does not have the residual signal. In addition, a CBP syntax of the current block 840 indicating the presence and absence of the residual signal may not be transmitted.

In this instance, when the residual signal exists, CBP=1, and when the residual signal does not exist, CBP=0.

When the CBP syntax is not transmitted, the decoder may infer that the residual signal does not exist. In addition, the encoder may transmit, to the decoder, information indicating which referencing blocks is used for the current blocks 840 through the reference block identifier.

FIG. 9 is a diagram illustrating an inter coding of a current block, in accordance with an inter macro block partition of a referencing block, according to an embodiment of the present invention.

Reconstructed blocks 920 within a current slice 910, referencing blocks 930 and 932 among the reconstructed blocks 920, a current block 940, an inter macro block partition 950 of the referencing block 932, and an inter macro block partition 960 of the current block 940 are illustrated.

An inter macro block partition 950 of an upper block 932 among the referencing blocks 930 and 932 may be used as an inter macro block partition 960 of the current block 940. That is, the current block 940 may be coded in accordance with an inter macro block partition 950 of the upper block 932.

The inter macro block partition 960 of the current block 940 may not be transmitted to the decoder. Information indicating that the upper block 932 is the referencing block of the current block 940 may be transmitted to the decoder through the referencing block identifier. The decoder may identify information indicating that the upper block 932 is the referencing block of the current block 940 through the referencing block identifier.

FIG. 10 is a diagram illustrating an inter coding of a current block, in accordance with a motion vector of a referencing block, according to an embodiment of the present invention.

Reconstructed blocks 1020 within a current slice 1010, referencing blocks 1030 and 1032 among the reconstructed blocks 1020, a current block 1040, a motion vector 1050 of the referencing block 1032, and a motion vector 1060 of the current block 1040 are illustrated.

The motion vector 1050 of an upper block 1032, among the referencing blocks 1030 and 1032, may be used as a motion vector 1060 of the current block 1040. That is, the current block 1040 may be coded in accordance with the motion vector 1050 of the upper block 1032.

The motion vector 1060 of the current block 1040 may not be transmitted to the decoder. Information indicating that the upper block 1032 is the referencing block of the current block 1040 may be transmitted to the decoder through a referencing block identifier. The decoder may identify information indicating that the upper block 1032 is the referencing block of the current block 1040 through the referencing block identifier.

FIG. 11 is a diagram illustrating an inter coding of a current block in accordance with a reference picture index of a referencing block according to an embodiment of the present invention.

Reconstructed blocks 1120 within a current slice 1110, referencing blocks 1130 and 1132 among the reconstructed blocks 1120, a current block 1140, a reference picture index 1150 of the referencing block 1132, and a reference picture index 1160 of the current block are illustrated.

The reference picture index 1150 of the upper block 1132 among the referencing blocks 1130 and 1132 may be used as the reference picture index 1160 of the current block 1140. That is, the current block 1140 may be coded in accordance with the reference picture index 1160 of the upper block 1132.

The reference picture index 1160 of the current block 1140 may not be transmitted to the decoder. Information indicating that the upper block 1132 is the referencing block of the current block 1140 may be transmitted, to the decoder, through the referencing block identifier. The decoder may identify information indicating that the upper block 1132 is the referencing block of the current block 1140 through the referencing block identifier.

FIG. 12 is a diagram illustrating an inter coding of a current block, in accordance with a reference picture list of a referencing block, according to an embodiment of the present invention.

Reconstructed blocks 1220 within a current slice 1210, referencing blocks 1230 and 1232 among the reconstructed blocks 1220, a current block 1240, a reference picture list 1250 of the referencing block and a reference picture list 1260 of the current block are illustrated.

A reference picture list 1250 of an upper block 1232 among the referencing blocks 1230 and 1232 may be used as a reference picture list 1260 of the current block 1240. That is, the current block 1240 may be coded in accordance with the reference picture list 1250 of the upper block 1232.

The reference picture list 1260 of the current block 1240 may not be transmitted to the decoder. Information indicating that the upper block 1232 is the referencing block of the current block 1240 may be transmitted to the decoder through the referencing block identifier. The decoder may identify information indicating that the upper block 1232 is the referencing block of the current block 1240 through the reference block identifier.

FIG. 13 is a diagram illustrating an inter coding of a current block in accordance with a prediction direction of a referencing block according to an embodiment.

Reconstructed blocks 1320 within a current slice 1310, referencing blocks 1330 and 1332 among the reconstructed blocks 1320, a current block 1340, a prediction direction 1350 of the referencing block and a prediction direction 1360 of the current block are illustrated.

The prediction direction 1350 of the upper block 1332, among the referencing blocks 1330 and 1332, may be used as the prediction direction 1360 of the current block 1340. That is, the current block 1340 may be coded in accordance with the prediction direction 1350 of the upper block 1332.

The prediction direction 1360 of the current block 1340 may not be transmitted to the decoder. Information indicating that the upper block 1332 is the referencing block of the current block 1340 may be transmitted to the decoder through a referencing block identifier. The decoder may identify information indicating that the upper block 1332 is the referencing block, of the current block 1340, through the referencing block identifier.

The method according to the above-described example embodiments may be recorded in non-transitory computer-readable media including program instructions to implement various operations embodied by a computer. The media may also include, alone or in combination with the program instructions, data files, data structures, and the like. Examples of non-transitory computer-readable media include magnetic media such as hard disks, floppy disks, and magnetic tape; optical media such as CD ROM discs and DVDs; magneto-optical media such as optical discs; and hardware devices that are specially configured to store and perform program instructions, such as read-only memory (ROM), random access memory (RAM), flash memory, and the like. Examples of program instructions include both machine code, such as produced by a compiler, and files containing higher level code that may be executed by the computer using an interpreter. The described hardware devices may be configured to act as one or more software modules in order to perform the operations of the above-described example embodiments, or vice versa. In addition, a non-transitory computer-readable storage medium may be distributed among computer systems connected through a network and non-transitory computer-readable codes or program instructions may be stored and executed in a decentralized manner.

A number of examples embodiments have been described above. Nevertheless, it should be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. An image decoding method, the method comprising:
   receiving a bit stream including information related with first intra prediction mode information indicating a first intra prediction mode of a first reference block in a current picture and second intra prediction mode information indicating a second intra prediction mode of a second reference block in the current picture; and
   performing an adaptive decoding for a target block based on the bit stream received,
   wherein the adaptive decoding determines an intra prediction mode of the target block based on both of the first intra prediction mode of the first reference block and the second intra prediction mode of the second reference block, and performs the decoding for the target block based on the determined intra prediction mode of the target block,
   wherein the first reference block is a block adjacent to the left of the target block and the second reference block is a block adjacent to the above of the target block, and
   wherein a respective intra prediction mode of a respective reference block is not used for determining the intra prediction mode of the target block if the respective reference block is located outside a boundary of a slice to which the target block belongs.

2. An image encoding method, the method comprising:
   performing an adaptive encoding on a target block, and generating a bit stream based on the encoded target block,
   wherein the adaptive encoding determines an intra prediction mode of the target block based on both of a first intra prediction mode of a first reference block and a second intra prediction mode of a second reference block and performs encoding on the target block based on the determined intra prediction mode of the target block,
   wherein the bit stream includes information related with first intra prediction mode information indicating the first intra prediction mode of the first reference block in a current picture and second intra prediction mode information indicating the second intra prediction mode of the second reference block in the current picture,
   wherein the first reference block is a block adjacent to the left of the target block and the second reference block is a block adjacent to the above of the target block, and
   wherein a respective intra prediction mode of a respective reference block is not used for determining the intra prediction mode of the target block if the respective reference block is located outside a boundary of a slice to which the target block belong.

3. A computer readable recording medium storing a bitstream for decoding an image, the bitstream comprising:
   encoded information of a target block including information related with first intra prediction mode information indicating a first intra prediction mode of a first reference block in a current picture and second intra prediction mode information indicating a second intra prediction mode of a second reference block in the current picture,
   wherein the encoded information of the target block is used for performing an adaptive decoding,
   wherein the adaptive decoding determines an intra prediction mode of the target block based on both of the first intra prediction mode of the first reference block and the second intra prediction mode of the second reference block and performs decoding the target block based on the determined intra prediction mode,
   wherein the first reference block is a block adjacent to the left of the target block and the second reference block is a block adjacent to the above of the target block, and
   wherein a respective intra prediction mode of a respective reference block is not used for determining the intra prediction mode of the target block if the respective reference block is located outside a boundary of a slice to which the target block belong.

* * * * *

UNITED STATES PATENT AND TRADEMARK OFFICE
CERTIFICATE OF CORRECTION

| | | |
|---|---|---|
| PATENT NO. | : 11,659,159 B2 | Page 1 of 1 |
| APPLICATION NO. | : 16/896493 | |
| DATED | : May 23, 2023 | |
| INVENTOR(S) | : Sung Chang Lim | |

It is certified that error appears in the above-identified patent and that said Letters Patent is hereby corrected as shown below:

On the Title Page

Column 1, under item (71) Applicant:
"(KP)" should read --(KR)--

Signed and Sealed this
Thirtieth Day of January, 2024

Katherine Kelly Vidal
*Director of the United States Patent and Trademark Office*